(12) United States Patent
Ueno et al.

(10) Patent No.: US 9,776,257 B2
(45) Date of Patent: Oct. 3, 2017

(54) T-SHAPED CUTTER, RIB-MACHINING METHOD AND AIRPLANE PART

(71) Applicant: MAKINO MILLING MACHINE CO., LTD., Tokyo (JP)

(72) Inventors: Hiroshi Ueno, Minamitsuru-gun (JP); Ryoichi Miyamoto, Minamitsuru-gun (JP)

(73) Assignee: MAKINO MILLING MACHINES CO., LTD., Tokyo (JP)

( * ) Notice: Subject to any disclaimer, the term of this patent is extended or adjusted under 35 U.S.C. 154(b) by 71 days.

(21) Appl. No.: 14/439,920

(22) PCT Filed: Oct. 31, 2012

(86) PCT No.: PCT/JP2012/078198
§ 371 (c)(1),
(2) Date: Apr. 30, 2015

(87) PCT Pub. No.: WO2014/068710
PCT Pub. Date: May 8, 2014

(65) Prior Publication Data
US 2015/0298225 A1     Oct. 22, 2015

(51) Int. Cl.
*B23C 5/10*     (2006.01)
*B23C 3/00*     (2006.01)
*B23C 1/12*     (2006.01)

(52) U.S. Cl.
CPC ............. *B23C 5/1054* (2013.01); *B23C 1/12* (2013.01); *B23C 3/00* (2013.01); *B23C 2215/04* (2013.01); *B23C 2222/28* (2013.01); *B23C 2250/12* (2013.01)

(58) Field of Classification Search
CPC ..... B23C 5/1054; B23C 3/00; B23C 2215/04; B64C 1/12
See application file for complete search history.

(56) References Cited

U.S. PATENT DOCUMENTS

| | | | |
|---|---|---|---|
| 3,597,817 A | 8/1971 | Whalley | |
| 4,733,995 A | * 3/1988 | Aebi | ..................... B23C 5/1054 407/34 |

(Continued)

FOREIGN PATENT DOCUMENTS

| | | |
|---|---|---|
| CN | 201572954 | 9/2010 |
| CN | 202317209 | 7/2012 |

(Continued)

OTHER PUBLICATIONS

International Search Report dated Nov. 27, 2012, directed to International Application No. PCT/JP2012/078198, 2 pages.

*Primary Examiner* — Timothy D Collins
*Assistant Examiner* — Keith L Dixon
(74) *Attorney, Agent, or Firm* — Morrison & Foerster LLP

(57) ABSTRACT

On the perimeter of a head (14) that is bonded on one end of the shank (12) of a T-shaped cutter, multiple end cutting edge sections (16) with a cutting edge (16a) on the tip side of the T-shaped cutter (10) and multiple upper edge sections (18) with a cutting edge (18a) on the base end side are disposed alternating in the circumferential direction of the T-shaped cutter. The cutting edges (16a, 18a) of the end cutting edge sections (16) and the upper edge sections (18) form an integral structure with the shank (12) and the head (14).

1 Claim, 10 Drawing Sheets

(56) References Cited

U.S. PATENT DOCUMENTS

| | | | |
|---|---|---|---|
| 5,597,268 A * | 1/1997 | Izumi | B23C 5/1054 407/51 |
| 6,976,810 B2 * | 12/2005 | Helvey | B23C 5/1054 407/30 |
| 7,972,545 B2 | 7/2011 | Bae | |
| 8,096,092 B2 * | 1/2012 | Vichniakov | B64C 1/12 244/117 R |
| 8,137,038 B2 * | 3/2012 | Katoh | B23C 3/00 409/132 |
| 8,708,611 B2 * | 4/2014 | Marshansky | B23C 5/1054 407/47 |
| 2004/0013477 A1 | 1/2004 | Helvey et al. | |
| 2012/0039676 A1 | 2/2012 | Marshansky | |
| 2012/0093602 A1 | 4/2012 | Osawa et al. | |
| 2012/0224930 A1 | 9/2012 | Katoh et al. | |

FOREIGN PATENT DOCUMENTS

| | | |
|---|---|---|
| JP | 56-83315 | 7/1981 |
| JP | 57-170914 | 10/1982 |
| JP | 58-177212 | 11/1983 |
| JP | 2000-326133 | 11/2000 |
| JP | 2003-165016 | 6/2003 |
| JP | 2009-18354 | 1/2009 |
| JP | 2010-528876 | 8/2010 |
| JP | 2010-284752 | 12/2010 |
| JP | 2011-88275 | 5/2011 |
| JP | 4830597 | 9/2011 |

* cited by examiner

1

T-SHAPED CUTTER, RIB-MACHINING METHOD AND AIRPLANE PART

CROSS-REFERENCE TO RELATED APPLICATIONS

This application is a U.S. National Phase application of International Patent Application No. PCT/JP2012/078198, filed on Oct. 31, 2012, which is hereby incorporated by reference in the present disclosure in its entirety.

FIELD OF THE INVENTION

The present invention relates to a T-cutter, a method of forming a rib which uses a T-cutter to cut out a rib which has an overhanging part, and an aircraft part which has a rib defining an overhanging part.

BACKGROUND OF THE INVENTION

For example, in order to form a "T-slot", in the past, a "T-slot cutter" has been used. A T-cutter is also used for forming an undercut at a side surface of a workpiece. Such a method of forming an undercut on a side surface of a workpiece is, for example, also applied when forming a return flange at a rib of a skin panel of a wing of an aircraft.

A T-cutter has a shank and a head which is joined with a front end of the shank. Usually, the head has cemented carbide tips screwed or soldered to it. There are also T-cutters which have polycrystalline diamond (PCD) tips soldered to their heads.

For example, PLT 1 describes a T-cutter which is provided with a groove part, which extends from an edge part side to a side opposite to the edge parts so as to be inclined in a direction opposite to a rotation direction about an axial center, at an outer circumferential surface of the shank so as to improve the discharge of chips. This T-cutter has cemented carbide throwaway tips screwed to the edge parts.

PLT 2 describes a T-cutter comprised of front end part side tips and proximal end side tips screwed to a cutting head while alternately arranged in a rotational direction of a tool.

CITATIONS LIST

PLT 1: Japanese Patent Publication No. 2009-18354A
PLT 2: Japanese Patent No. 4830597B2

SUMMARY OF THE INVENTION

In a T-cutter with cemented carbide tips screwed to it as described in PLTs 1 and 2, due to variations in centrifugal force or the radii of rotation of the tips, the spindle rotational speed has been limited to about 1000 rpm and the feed speed to several hundred mm/min or so, so the processing efficiency, which is shown by rate of removal of material from the workpiece per unit time (MRR ($cm^3$/min)), becomes low. Further, in the case of processing along a curved surface such as shown in FIG. 13 or the case of processing on a slanted surface such as shown in FIG. 14 by a T-cutter with tips soldered to it, a cutting force acts in the axial direction of the tool, and therefore there is the problem that the tips easily detach from the head of the T-cutter. To prevent this, it is necessary to further decrease the rotational speed or feed speed of the tool. Such processing of curved surfaces or slanted surfaces, for example, is necessary when producing skin panels or leading edges of the wings of aircraft, etc.

On the other hand, a T-cutter which has polycrystalline diamond (PCD) tips soldered to its head, compared with a T-cutter which has cemented carbide tips screwed or soldered to it, can increase the rotational speed of the tool and increase the processing efficiency. However, when performing processing along a curved surface such as shown in FIG. 13 or when performing processing on a slanted surface such as shown in FIG. 14 where a cutting force acts in the axial direction of the tool, in the same way as the case of tips made of cemented carbide, there is the problem of the tips easily detaching from the head and, again, it is not possible to increase the rotational speed or feed speed of the tool.

Therefore, the present invention has as its technical problem so solve such problems of the prior art and has as its object the provision of a T-cutter which can form a rib which has an overhanging part by high speed rotation and high speed feed, in particular can form a 3D undercut shape, a method of forming such a rib, and an aircraft part.

To achieve the already explained object, according to the present invention, a T-cutter comprising a shank and a head which is provided at one end of the shank and which alternately arranges in a peripheral direction of the T-cutter a plurality of bottom edge parts which have cutting edges at a distal end side of the T-cutter of an opposite side from the shank and a plurality of top edge parts which have cutting edges at a proximal end side of the T-cutter in proximity to the shank side, the cutting edges of the bottom edge parts and the top edge parts being formed integrally in structure with the shank and the head is provided.

Further, according to the present invention, a method of forming a rib which cuts out a rib which has an overhanging part at a workpiece is provided, the method of forming a rib comprising forming a rib part of the workpiece while leaving a thickness of at least a width dimension of the overhanging part, attaching a T-cutter, comprising a shank and a head which is provided at one end of the shank and which alternately arranges in a peripheral direction of the T-cutter a plurality of bottom edge parts which have cutting edges at a distal end side of the T-cutter of an opposite side from the shank and a plurality of top edge parts which have cutting edges at a proximal end side of the T-cutter in proximity to the shank side, the cutting edges of the bottom edge parts and the top edge parts being formed integrally in structure with the shank and the head, to a spindle of a machine tool, rotating it, and moving the workpiece and the T-cutter relative to each other so as to cut out the rib so that the overhanging part remains.

Further, according to the present invention, an aircraft part which has a rib which has an overhanging part which is formed by cutting a workpiece material by a machine tool is provided, in which an aircraft part is obtained by forming a rib part of the workpiece material while leaving a thickness of at least a width dimension of the overhanging part, attaching a T-cutter, comprising a shank and a head which is provided at one end of the shank and which alternately arranges in a peripheral direction of the T-cutter a plurality of bottom edge parts which have cutting edges at a distal end side of the T-cutter of an opposite side from the shank and a plurality of top edge parts which have cutting edges at a proximal end side of the T-cutter in proximity to the shank side, the cutting edges of the bottom edge parts and the top edge parts being formed integrally in structure with the shank and the head, to a spindle of a machine tool, rotating it, and moving the workpiece material and the T-cutter relative to each other so as to cut out the rib so that the overhanging part remains.

According to the present invention, the T-cutter is designed as a solid-type cutting tool where the head, including the edge parts, and the shank are formed integrally without soldering or other joining means, compared with a conventional T-cutter with cemented carbide tips screwed or soldered to it or a T-cutter of the prior art with PCD tips soldered to the head, not only when performing 2D processing, but also when performing processing along a curved surface or when processing a slanted surface to form a 3D undercut shape, the tips will not fall off, the rotational speed and feed speed can be made extremely high, and the processing efficiency can be extremely high.

In particular, by applying the T-cutter and method of forming a rib to processing of an aircraft part which has a rib with an overhanging part, for example, a skin panel of a wing, leading edge, wing rib, or other wing member, a high MRR can be obtained. They perform formidably in the production of aircraft parts where almost the entire large block material of an aluminum alloy is cut away to form ribs which has overhanging parts.

DETAILED DESCRIPTION OF THE INVENTION

Figure 1:
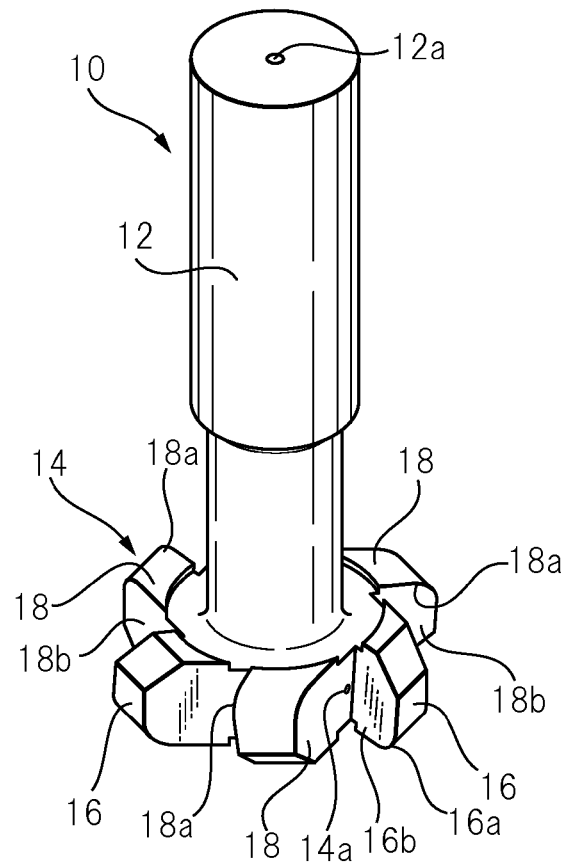
FIG. 1 is a perspective view of a T-cutter of a preferable embodiment of the present invention.
Figure 2:
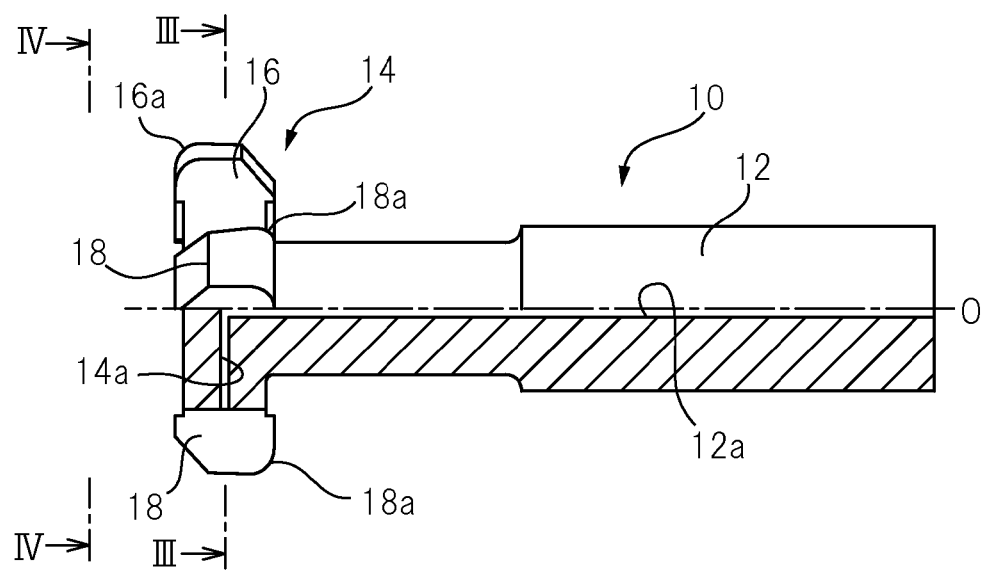
FIG. 2 is a semi-cross-sectional view in an axial direction of a T-cutter of FIG. 1.
Figure 3:
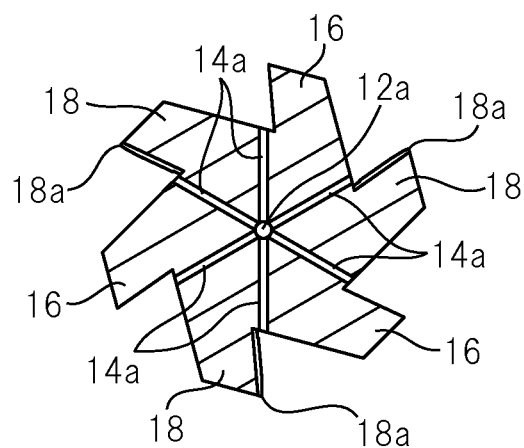
FIG. 3 is a cross-sectional view of a head of a T-cutter along an arrow line III-III of FIG. 2.
Figure 4:
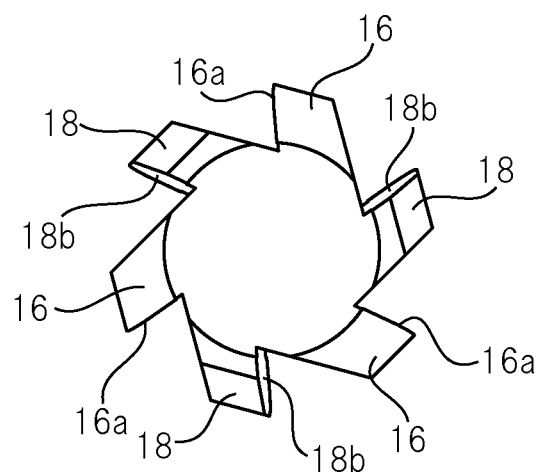
FIG. 4 is an end view of a head of a T-cutter along an arrow line IV-IV of FIG. 2.

Below, referring to the attached drawings, a preferred embodiment of the present invention will be explained. First, referring to FIG. 1 to FIG. 6, a preferred embodiment of a T-cutter of the present invention will be explained. A T-cutter 10 is comprised of a shank 12 which is to be attached to a front end part of a spindle 116 and a head 14 which is formed at the distal end of the shank 12. The head 14 is formed with a plurality of, in the present embodiment, six, edge parts. The edge parts are comprised of three bottom edge parts 16 which have cutting edges 16a at the distal end side of the T-cutter 10, i.e., the opposite side to the shank 12, and three top edge parts 18 which have cutting edges 18a at the proximal end side of the T-cutter 10, i.e., the shank 12 side. The T-cutter 10 is a so-called "solid type" of cutting tool where the head 14, including the edge parts 16, 18, and the shank 12, are formed integrally by a single base material of cemented carbide without soldering or other joining means.

Figure 5:
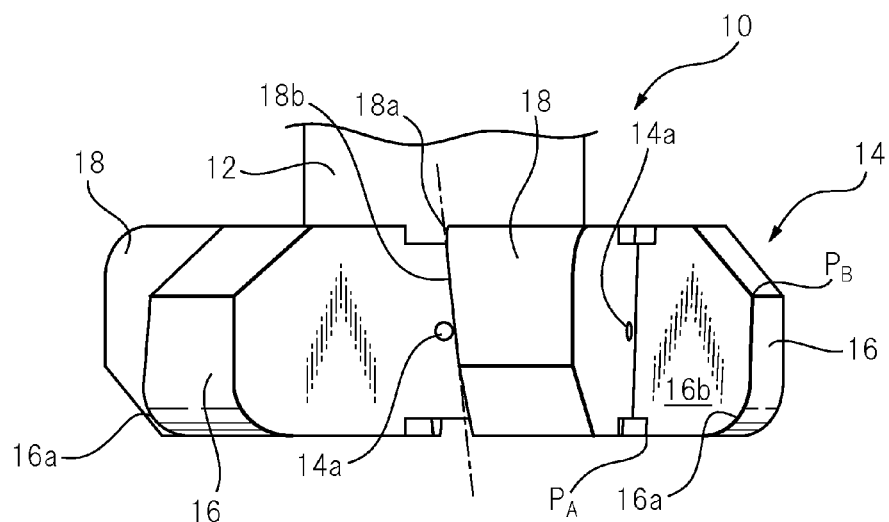
FIG. 5 is a partial enlarged side surface view which shows a head of a T-cutter of FIG. 1.
Figure 6:
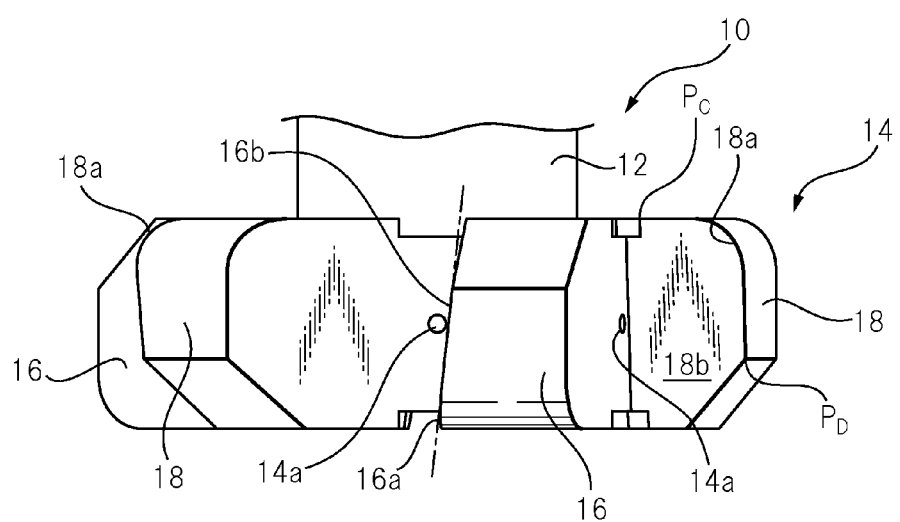
FIG. 6 is a partial enlarged side view similar to FIG. 5 which is shown at a rotational position different from FIG. 5.

The cutting edges 16a of the bottom edge parts 16 are formed by ridgelines $P_A$-$P_B$ where the bottom faces, side faces, and corners R between the two of the bottom edge parts 16 intersect the rake faces 16b (see FIG. 5). Similarly, the cutting edges 18a of the top edge parts 18 are formed by ridgelines $P_C$-$P_D$ where the bottom faces, side faces, and corners R between the two of the top edge parts 18 intersect the rake faces 18b (see FIG. 6). The sizes of the corners R are set to match the sizes of the fillets R which are formed at the workpiece. Further, the bottom edge parts 16 and the top edge parts 18 are arranged alternately at equal intervals in the peripheral direction of the head 14. Further, if particularly referring to FIGS. 5 and 6, the rake faces 16b of the bottom edge parts 16 are slanted upward, i.e., so as to approach the shank 12, while the rake faces 18b of the top edge parts 18 are slanted to the opposite side from the rake faces 16b of the bottom edge parts 16 so as to approach the distal end direction of the T-cutter 10.

Furthermore, the T-cutter 10 is formed with coolant passages for feeding a coolant to the processing region. The coolant passages are comprised of an axial direction passage 12a which runs through the shank 12 along the center axial line O and radial direction passages 14a which run from the axial direction passage 12a in the radial direction through the head 14, extend in the directions of the rake faces 16b, 18b of the bottom edges part 16 and top edge parts 18, and open so as to eject coolant toward the cutting edges 16a, 18a. The coolant passages communicate with a coolant feed pipe (not shown) which is provided at the inside of the spindle 116 so as to supply coolant toward the cutting edges 16a, 18a, whereby generation of heat is reduced and the tool life and chip discharge become better.

Figure 7:
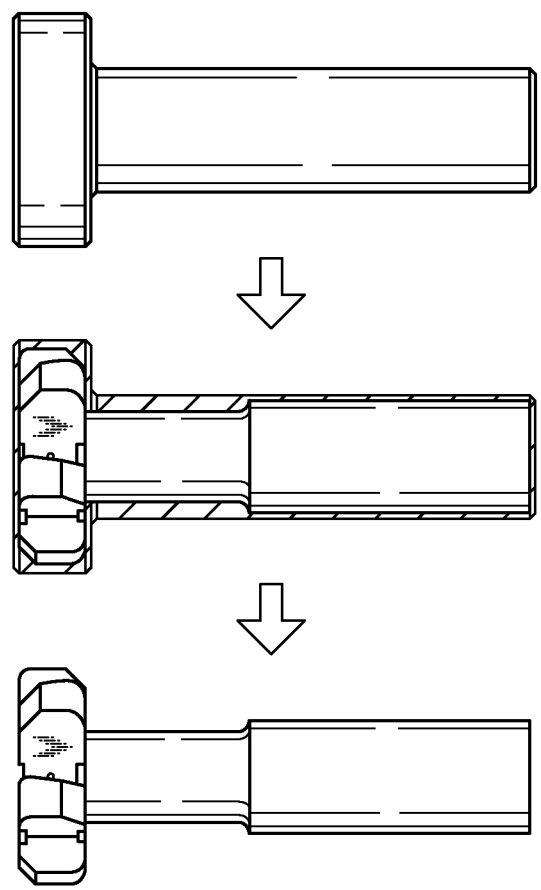
FIG. 7 is a schematic view which shows a method of production of a T-cutter according to the present invention.
Figure 8:
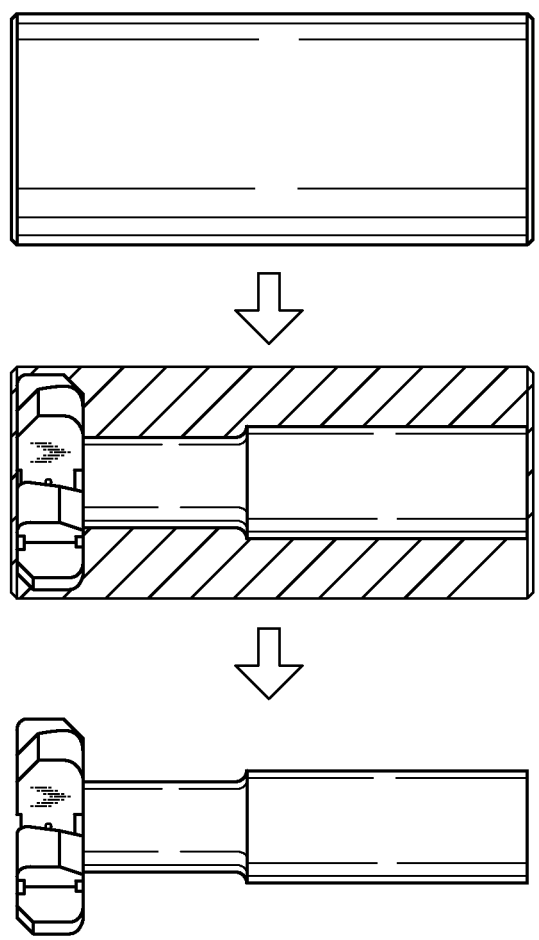
FIG. 8 is a schematic view which shows a method of production of a T-cutter according to the prior art.

Next, referring to FIGS. 7 and 8, in the past, when producing such a solid type of T-cutter, as shown in FIG. 8, a powder of cemented carbide was molded into a cylindrical shape and sintered to prepare a cemented carbide cylindrical member and this cylindrical member was ground down to prepare a T-cutter. As opposed to this, in the present invention, as shown in FIG. 7, cemented carbide powder can be molded into a shape forming a generally T-shape in the side view close to the final shape of the T-cutter 10 and sintered, then that can be ground down to form the shank 12 and head 14 of the T-cutter 10. Due to this, the material which is removed by the grinding operation, which is shown by the hatching in FIGS. 7 and 8, is remarkably reduced and the cost of materials, manufacturing time, and manufacturing cost of the T-cutter 10 are reduced. Furthermore, the lifetime of the grinding stone which is used for the grinding operation also becomes remarkably longer. The coolant passages 12a, 14a can be formed by electrical discharge machining or other known methods for forming small holes.

Next, referring to FIG. 9 to FIG. 12, using as an example the formation of ribs at the skin panel of the wing of an aircraft as 3D undercut shapes, the method of using a T-cutter 10 to cut out ribs which have overhanging parts, i.e., cut out return flange parts, will be explained.

Figure 11:
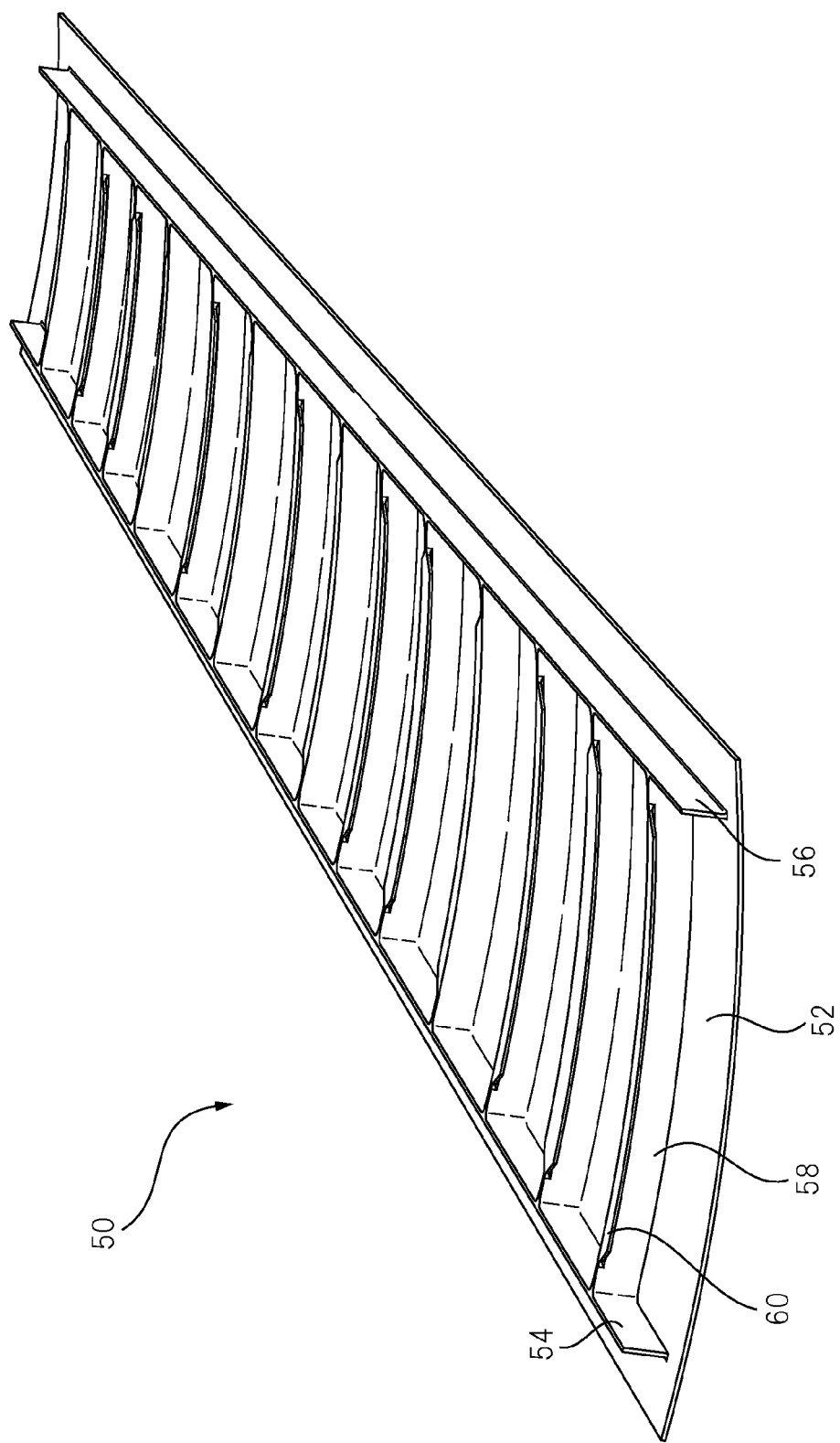
FIG. 11 is a perspective view which shows a back surface of a skin panel of a wing of an aircraft.

A skin panel 50 of the wing of an aircraft which is shown as one example in FIG. 11 is provided with an outer skin 52, a pair of longitudinal ribs 54, 56 which extend in a longitudinal direction along an inner surface of the outer skin 52, and a plurality of traverse ribs 58 which extend between the longitudinal ribs 54, 56. At the traverse ribs 58, return flanges (overhanging parts) 60 extend along the edge parts at the opposite sides from the outer skin 52. The outer skin 52, longitudinal ribs 54, 56, traverse ribs 58, and return flanges 60 are cut out from a single aluminum alloy block. Further, the outer skin 52 of the skin panel 50 which forms part of the wing of the aircraft is not a 2D flat surface, but extends in three dimensions so as to form part of the wing shape along with the shape of the wing surface. The longitudinal ribs 54, 56, traverse ribs 58, and return flanges 60 are also curved three-dimensionally so as to match with the three-dimensional shape of the outer skin 52.

Figure 12:
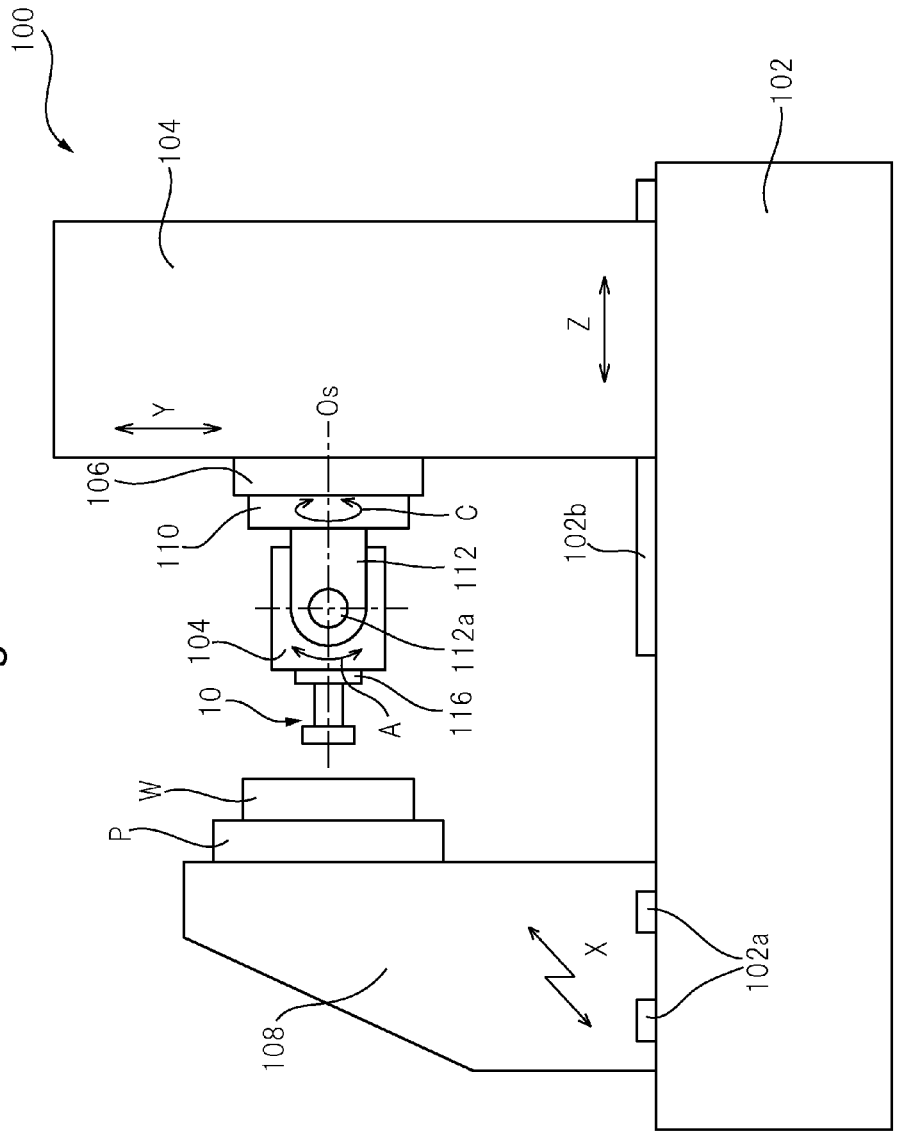
FIG. 12 is a side view of a horizontal five-axis machining center which is shown as one example of a machine tool for forming a 3D return flange using the T-cutter of the present invention.

Next, referring to FIG. 12, a machine tool 100 which uses a T-cutter 10 to form a rib which has a 3D return flange such as with the skin panel 50 of the wing of an aircraft which is shown in FIG. 11 will be shown. The machine tool 100 is configured as a horizontal machining center which is comprised of a bed 102 which forms a base part which is fastened to the floor of a factory, a column 104 which is attached to a top surface of a rear part of the bed 102 so as to be able to move through a Z-axis feed mechanism in a front-rear direction (Z-axial direction, in FIG. 7, left-right direction), a spindle table 106 which is attached to a front surface of the column 104 so as to be able to move through a Y-axis feed mechanism (not shown) in a top-down direction (Y-axial direction), and a table 108 which is attached to a top surface of a front part of the bed 102 so as to be able to move through an X-axis feed mechanism in a left-right direction (X-axial direction, in FIG. 7, direction vertical to paper surface). At the table 108, a pallet P on which a workpiece W is fastened is attached. Further, a pallet P on which a workpiece W which has finished being processed on the table 108 is fastened is changed by a not shown pallet changer to a pallet P on which an unprocessed workpiece is fastened. In the present embodiment, the workpiece W can, for example, be made the skin panel 50 of the wing of an aircraft. Further, as the NC machine tool, a vertical machining center can also be employed.

At the spindle table 106, a swivel base 110 is supported to be able to rotate about a C-axis direction centered about the Z-axis. The swivel base 110 has bracket parts 112 at the two side parts straddling the rotational axis of the swivel base 110. At the bracket parts 112, a spindle head 114 is attached to be able to rotate in an A-axial direction by a shaft 112a which is parallel to the X-axis. At the spindle head 114, a spindle 116 is supported to be able to rotate about a rotational axis Os in the longitudinal direction. At the front end part of the spindle 116, a T-cutter 10 is attached.

Note that, the X-axis feed mechanism may be provided with a pair of X-axis guide rails 102a which extend at the top surface of the bed 102 in the left-right direction horizontally, a guide block (not shown) which is attached to a bottom surface of the table 108 to be able to slide along the X-axis guide rails 102a, an X-axis ball-screw (not shown) which extends in the bed 102 in the X-axial direction, a nut (not shown) which is attached to a bottom end part of the table 108 and engages with the X-axis ball-screw, and a servo motor (not shown) which is coupled with one end of the X-axis ball-screw and drives rotation of the X-axis ball-screw.

Similarly, the Y-axis feed mechanism may be provided with a pair of Y-axis guide rails (not shown) which extend vertically in the column 104, a guide block (not shown) which is attached to the spindle table 106 to be able to slide along the Y-axis guide rails, a Y-axis ball-screw (not shown) which extends in the column 104 in the Y-axial direction, a nut (not shown) which is attached inside the spindle table 106 and engages with the Y-axis ball-screw, and a servo motor (not shown) which is coupled with one end of the Y-axis ball-screw and drives rotation of the Y-axis ball-screw.

Similarly, the Z-axis feed mechanism may be provided with a guide block (not shown) which is attached to the top surface of the bed 102 in the front-rear direction horizontally and which is attached to the bottom surface of the column 104 to be able to slide along the Z-axis guide rails 102b, a Z-axis ball-screw (not shown) which extends in the bed 102 in the Z-axial direction, a nut (not shown) which is attached to the bottom surface of the column 104 and engages with the Z-axis ball-screw, and a servo motor (not shown) which is coupled with one end of the Z-axis ball-screw and drives rotation of the Z-axis ball-screw. In this way, the machine tool 100 forms a five-axis NC machine tool which has three linear feed axes of the X-axis, Y-axis, and Z-axis and two rotational feed axes of the A-axis and C-axis.

To use the T-cutter 10 to form return flanges on the skin panel of the wing of an aircraft, first, an aluminum alloy block which has dimensions larger than the skin panel 50 is attached as a workpiece W to the table 108 in the state fastened to a pallet P. Next, for example, a rotary cutting tool such as an end mill (not shown) is attached to the spindle 116 of the machine tool 100. By controlling the feed operations of the five axes of the machine tool 100, the workpiece W is processed whereby a skin panel which has an outer skin 52, longitudinal ribs 54, 56, and traverse ribs 58 (rib parts) not provided with return flanges 60 is formed. At this time, the traverse ribs (rib parts) 58 have thicknesses of at least the width dimension of the return flanges 60 which enable formation of the return flanges 60.

Figure 9:
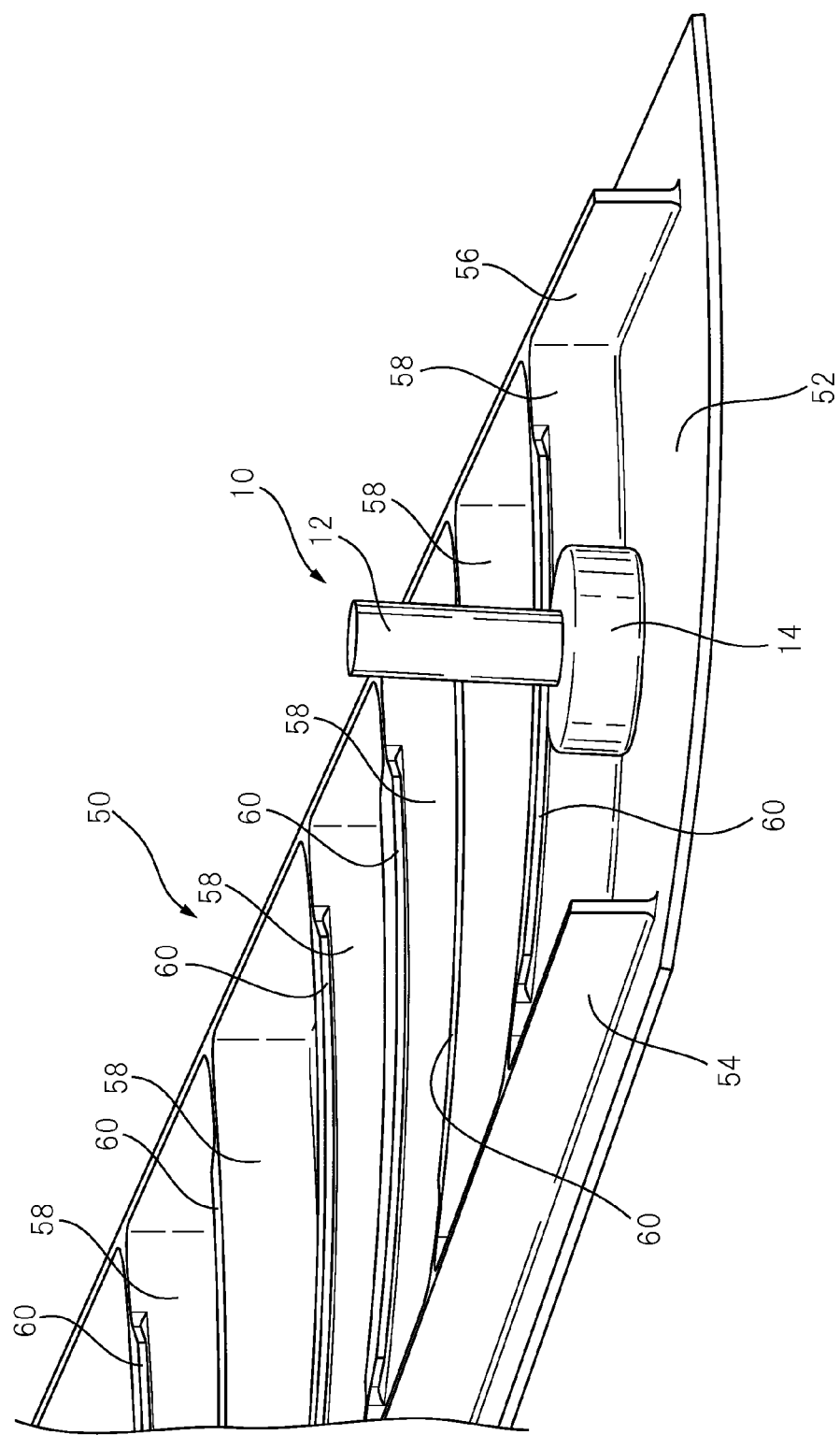
FIG. 9 is a perspective view which shows part of a skin panel of a wing of an aircraft which is formed by the T-cutter of the present invention.
Figure 10:
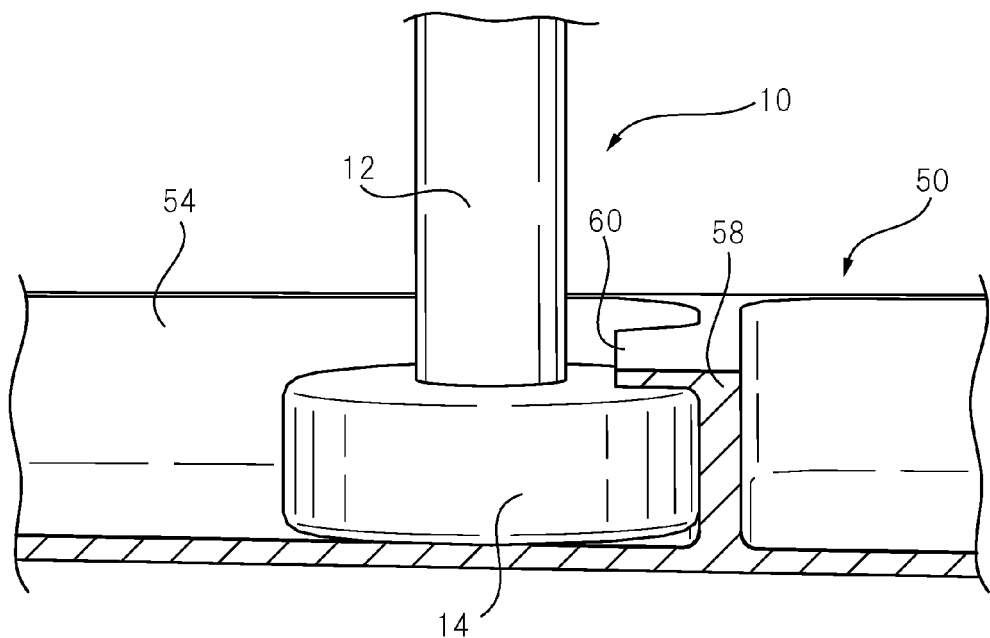
FIG. 10 is an enlarged cross-sectional view which shows part of a skin panel of a wing of an aircraft which is formed by the T-cutter of the present invention.

Next, for example, an automatic tool changer (not shown) of the machine tool 100 is used to change the conventional end mill to the T-cutter 10. Next, by feed control of the five axes of the three linear feed axes of the X-axis, Y-axis, and Z-axis and the two rotational axes of the A-axis and C-axis of the machine tool 100, as shown in FIGS. 9 and 10, the T-cutter 10 is moved along the inside surface of the outer skin 52 and the side surfaces of the traverse ribs 58 while making predetermined depths of cuts to the side surfaces of the traverse ribs 58. Due to this, 3D undercut shapes are cut at the side surfaces of the traverse ribs 58 and return flanges 60 are formed at the traverse ribs 58 along the edge parts (in FIGS. 9 and 10, top edge parts) at the opposite side from the outer skin 52. The return flanges 60 may stick out from only single sides of the traverse ribs 58 or may stick out from both sides of the traverse ribs 58.

Figure 13:
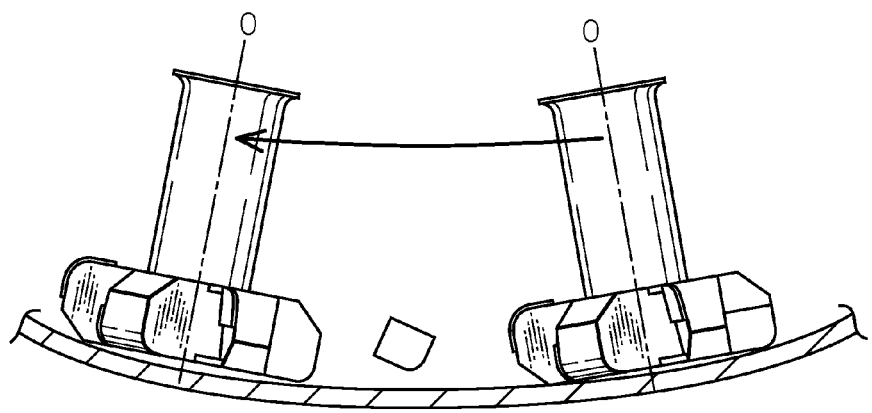
FIG. 13 is a schematic view shows a problem point when using a T-cutter according to the prior art to cut a curved surface.
Figure 14:
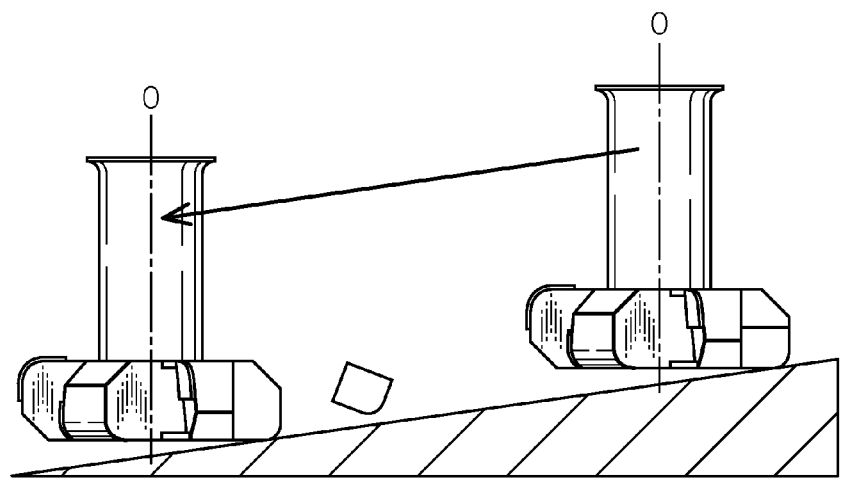
FIG. 14 is a schematic view which shows a problem point when using a T-cutter according to the related art to cut a slanted surface.

According to the present embodiment, the T-cutter 10 is a solid-type cemented carbide cutting tool where the head 14, including the cutting edges 16a, 18a, and the shank 12 are formed integrally without soldering or other joining means, compared with a conventional T-cutter with cemented carbide tips screwed or soldered to it, not only when performing 2D processing, but also when processing along a curved surface such as shown in FIG. 13 which is slanted with respect to a plane vertical to the axial line O of the T-cutter 10, or when processing of a slanted surface such as shown in FIG. 14, the rotational speed and feed speed can be made extremely high, and the processing efficiency can be extremely high.

One example of the processing results will be shown. Aluminum alloy workpieces were processed to form 3D undercut shapes using φ45 outside diameter T-cutters. As the T-cutters, two types, a conventional cutter which has cemented carbide soldered edges and a cutter of the present invention which is a solid type of cemented carbide, were prepared. The heights of the edges from the bottom edge parts to the top edge parts were 16 mm in both cutters. The conventional cutter suffered from some vibration at a rotational speed of 1000 rpm, feed speed of 263 mm/min, and radial direction depth of cut of 11 mm and approached the limit of processing ability. The MRR at this time was 46 cm$^3$/min. As opposed to this, the cutter of the present invention suffered from some vibration at a rotational speed of 33000 rpm, feed speed of 11000 mm/min, and radial direction depth of cut of 4 mm and approached the limit of processing ability. The MRR at this time was 704 cm$^3$/min. The cutter of the present invention had an efficiency 15.3 times higher compared with the conventional cutter. Therefore, the T-cutter of the present invention exhibits a remarkable effect if used under processing conditions of an MRR of 100 cm$^3$/min to 1000 cm$^3$/min.

REFERENCE SIGNS LIST

10 T-cutter
12 shank
12a axial direction passage (coolant passage)
14 head
14a radial direction passage (coolant passage)
16 bottom edge part
18 top edge part
50 skin panel
60 return flange
100 machine tool
102 bed
104 column
108 table
114 spindle head
116 spindle

The invention claimed is:

1. A method of forming a rib having an overhanging part by cutting a workpiece made of an aluminum alloy, the method comprising:
    providing a T-cutter, which comprises a shank and a head provided at an end of the shank, the head defining a plurality of bottom edge parts and top edge parts alternately arranged in a peripheral direction of the T-cutter, each of the bottom edge parts having a cutting edge formed by a ridgeline defined by intersection between a rake face of the bottom edge part, and a bottom face, a side face, and an R-corner therebetween of the bottom edge part, each of the top edge parts having a cutting edge formed by a ridgeline defined by intersection between a rake face of the top edge part, and a top face, a side face, and an R corner therebetween of the top edge part,
    forming a rib part of said workpiece, while the workpiece is mounted to a table of a five-axis machine tool having three linear feed axes and two rotational feed axes, by using an end mill attached to a spindle, while leaving a thickness of at least a width of said overhanging part;
    attaching the T-cutter, with said shank and said head, to the spindle of the five-axis machine tool, rotating the spindle; and
    moving said workpiece mounted to the table of the five-axis machine tool and said T-cutter relative to each other under five-axis control of the five-axis machine so as to form the overhanging part in a form of a three-dimensional undercut shape defined by a curved surface which is slanted with respect to a plane vertical to an axial line of the T-cutter, after determining processing conditions so as to remove 100 cm to 1000 cm of material from the workpiece per minute.

* * * * *